United States Patent [19]

Seiz et al.

[11] 4,163,096
[45] Jul. 31, 1979

[54] EPOXY RESIN MIXTURE FOR THE PRODUCTION OF FLEXIBLE MOULDED ARTICLES

[75] Inventors: Wolfgang Seiz, Pfeffingen; Roland Moser, Basel, both of Switzerland

[73] Assignee: Ciba-Geigy Corporation, Ardsley, N.Y.

[21] Appl. No.: 955,859

[22] Filed: Oct. 30, 1978

[30] Foreign Application Priority Data

Nov. 2, 1977 [CH] Switzerland .................. 13351/77

[51] Int. Cl.² ................................................. C08L 63/00
[52] U.S. Cl. ........................................ 528/69; 528/73; 525/528
[58] Field of Search .................. 528/69, 73; 260/83 P

[56] References Cited

U.S. PATENT DOCUMENTS

| 3,338,873 | 8/1967 | Gurgiolo | 528/69 |
| 3,494,888 | 2/1970 | McElroy | 528/69 |
| 3,634,327 | 1/1972 | Hawkins | 528/69 |

*Primary Examiner*—Paul Lieberman
*Attorney, Agent, or Firm*—Joseph F. DiPrima

[57] ABSTRACT

An epoxy resin mixture of compounds of the formula

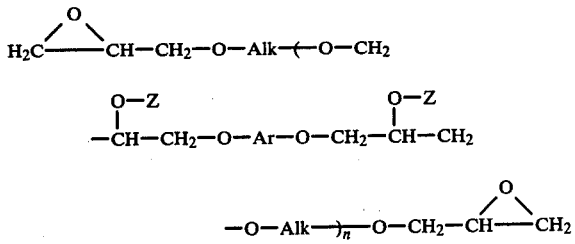

wherein
Alk—represents a defined alkylene group,
Ar—represents a defined arylene group, each Z independently of the other represents hydrogen or the group

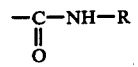

(derived from the reaction of a hydroxyl group with a monoisocyanate) and 50–500% of all Zs represent the group

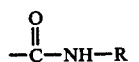

This mixture is suitable for the manufacture of flexible moulded articles having a high tear growth resistance.

17 Claims, No Drawings

EPOXY RESIN MIXTURE FOR THE PRODUCTION OF FLEXIBLE MOULDED ARTICLES

The invention relates to an epoxy resin mixture which is suitable for the manufacture of flexible moulded articles, a process for the production of the mixture and the use thereof for the manufacture of flexible moulded articles. Flexible moulded articles made of epoxy resins are obtained either from mixtures of long chain aliphatic epoxy compounds and hardeners or from epoxy resins to which flexibilising hardeners have been added, or from epoxy resin-hardener mixtures which contain known external plasticisers. A tear growth resistance which is insufficient for many purposes constitutes a drawback of the moulded articles manufactured by this process.

In a further process, epoxy resins are hardened with liquid polymers which contain reactive end groups, such as butadiene-acrylonitrile polymers which contain carboxyl end groups, resulting in elastomeric products. A disadvantage of this process is the high viscosity.

For the production of flexible coatings, bonds or mouldings it has also already been proposed to improve resins of higher molecular weight obtained from monomeric bisphenol-A diglycidyl ether by reaction with polyalcohols by modifying them with monoisocyanates. The high viscosity or the solid aggregate state of the resulting resins, however, rules out a solvent-free processing at room temperature.

The same applies to epoxy resins which are first modified with isocyanate/diol adducts and then reacted with bisphenols.

Accordingly, the invention provides a mixture of epoxy resins with which it is possible to manufacture flexible moulded articles that do not have the drawbacks referred to above, or which can be processed without these drawbacks. The mixture of the present invention consists of a mixture of compounds of the formula I

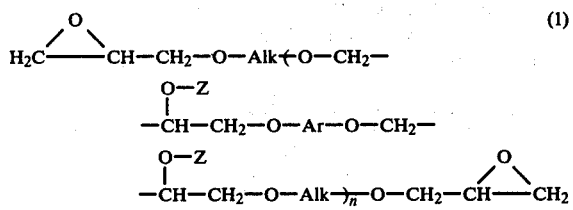
(1)

wherein

Alk—represents an alkylene group of 1 to 15 carbon atoms,

Ar—represents an unsubstituted or substituted o-, m- or p-phenylene group or a group of the formula

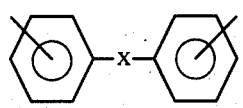

wherein the benzene nuclei can be substituted by halogen, alkyl or alkenyl of 1 to 4 or 2 to 4 carbon atoms respectively, and X—represents an alkylene or polyoxyalkylene group of 1 to 15 carbon atoms, a carbonyl, oxygen or sulfonyl bridge, and n in the mixture is in general an integer from 0.3 to 1.5, each Z independently of the other represents hydrogen or the group

wherein R represents an alkyl group of 1 to 10 carbon atoms, a cycloalkyl group containing 5 or 6 carbon atoms in the ring, an aralkyl group of 7 to 10 carbon atoms or a phenyl group which is unsubstituted or substituted by halogen and/or lower alkyl groups, and the above groups can also contain a

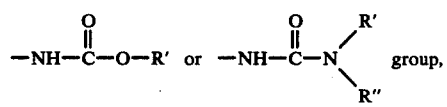 group, in which R' and R" represent an alkyl group of 1 to 10 carbon atoms, a cycloalkyl group containing 5 or 6 carbon atoms in the ring, an aralkyl group of 7 to 10 carbon atoms or a phenyl group which is unsubstituted or substituted by halogen and/or lower alkyl groups, but 50 to 100% of all the Zs represent the group

and the viscosity $\eta$ of the mixture is not more than 20 Pas (200 P).

Preferably, Alk represents an alkylene group of 1 to 10, in particular 2 to 6, carbon atoms, especially a 1,4-butylene group or a 2,2-dimethyl-1,3-propylene group.

Ar preferably represents a group of the formula

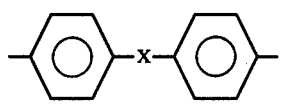

wherein the benzene nuclei can be substituted by alkyl or alkenyl groups of 1 to 4 or 2 to 4 carbon atoms respectively, and X represents a carbonyl or oxygen bridge or an alkylene group of 1 to 4 carbon atoms, in particular a methylene group or a 2,2-propylene group.

Preferably, 65 to 100% of all the Zs represent the group

wherein R preferably represents a phenyl group which is unsubstituted or substituted by halogen and/or lower alkyl groups of 1 to 4 carbon atoms, but in particular represents the unsubstituted phenyl group.

Most preferably, Z represents hydrogen or the group

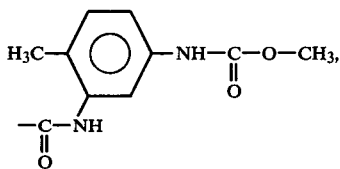

in which case 25% of all the Zs represent hydrogen.

In the mixture of the formula I, η is preferably 0.5 to 1 and the viscosity of the mixture at 25° C. is not more than 15 Pas; in particular, the viscosity is between 0.1 and 10 Pas.

The invention also provides a process for the production of a mixture of the formula I, which comprises reacting a compound of the formula II

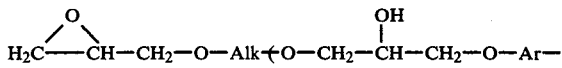

which is liquid at room temperature, with a compound of the formula III $$R-N=C=O \qquad (III)$$

wherein Alk, Ar, R and n are as defined in formula I, in such amounts that 1 to 2 molecules of the compound of the formula III are present per 2 hydroxyl groups. Preferably, 65 to 100 molecules of the compound of the formula III are present per 100 hydroxyl groups.

Aromatic, araliphatic, cycloaliphatic or aliphatic monoisocyanates can be used as compounds of the formula III. The monoisocyanates can be obtained for example from diisocyanates by reacting one of the isocyanate groups with a secondary monoamine or a monofunctional alcohol. The preferred compound of the formula III is phenyl isocyanate.

The reaction between the compounds of the formulae II and III can be carried out in a solvent or in substance. The procedure can be to charge the reaction vessel with the isocyanate and to add the epoxy resin or vice versa. The reaction can be carried out without a catalyst or in the presence of one of the conventional catalysts for the reaction of OH/isocyanate. Conventional catalysts are for example tertiary amines, tin(II) or tin(IV) compounds (tin(II) octoate, dibutyl tin laurate), or zinc salts. The catalysts are ordinarily employed in amounts of 0.02 to 0.6% by weight. Advantageously, the procedure is as follows:

The reaction is carried out without a solvent. The hydroxylated epoxy resin is charged into the reaction vessel, heated to 50°-60° C. and then the monoisocyanate is slowly added. When the addition of isocyanate is complete, the temperature is maintained until the free monoisocyanate is completely reacted. If the reaction is carried out using an excess of monoisocyanate to convert all the OH groups into urethane groups, then the residue can either be distilled off, for example at elevated temperature in vacuo, or converted with a monoalcohol into a virtually non-toxic product.

The manufacture of the compounds of the formula II corresponds to the advancement process employed in the synthesis of bisphenol epoxy resins of higher molecular weight. An aliphatic diglycidyl compound is used in this case as basic compound. A difunctional phenolic compound is employed as chain extender. The reaction can be carried out without a catalyst; however, the catalysts conventionally employed in the advancement process can also be added. Examples of suitable catalysts are tertiary amines, heterocyclic nitrogen compounds, such as imidazoles, quaternary ammonium compounds or phosphonium compounds.

The difunctional phenolic compound employed as chain extender is dissolved in the aliphatic epoxy resin. The catalyst can be added before or afterwards. The mixture is then heated to a temperature of about 90° to 130° C., preferably 120° to 140° C., until the epoxide content has reached the desired value and remains substantially constant. The amount of chain extender is so chosen that the viscosity of the resulting resin of higher molecular weight at 25° C. does not exceed 15 Pas.

Starting materials for the synthesis of the resins of the invention are reaction products obtained for example from aliphatic diglycidyl ethers (e.g. butanediol diglycidyl ether, hexanediol diglycidyl ether) and divalent phenols which can be mononuclear (resorcinol, hydroquinone) or binuclear (bisphenol A, bisphenol F, o,o'-diallyl bisphenol A), and which are liquid at room temperature.

A number of examples for the manufacture of resins suitable as starting materials are provided in Table 1. A technically pure butanediol diglycidyl ether with an epoxide content of 9.25 eq./kg is used as epoxy resin in experiments (a) to (f). A technically pure neopentyl glycol diglycidyl ether with an epoxide content of 8.13 eq./kg is used in experiment (g). As divalent phenolic components there are used: bisphenol A=A in Table 1, o,o'-diallylbisphenol A=B in Table 1, and resorcinol=C in Table 1.

The reaction for obtaining the products is carried out for 24 hours at 120° C. The viscosity of the resulting resin is measured at 25° C. and indicated in Pas. The epoxide group content, indicated in equivalents per kg, has been measured, whereas the hydroxyl group content, in equivalents per kg, and the average molecular weight, have been calculated (the hydroxyl group content from the ratio of bisphenol/epoxy resin and the molecular weight from the epoxide group content).

TABLE 1

| Manufacture and properties of resins used as starting materials | | | | | |
|---|---|---|---|---|---|
| Experiment | Reaction product | Phenolic component g/100 g of resin | Viscosity η in Pas | Epoxide content eq./kg | OH-content eq./kg | Average mol. wt. |
| a | A 30 | A,30 | 0.745 | 4.89 | 2.02 | 408 |
| b | B 30 | B,30 | 0.205 | 5.65 | 1.5 | 370 |
| c | B 50 | B,50 | 1.310 | 3.83 | 2.2 | 522 |
| d | B 70 | B,70 | 7.780 | 2.72 | 2.7 | 735 |
| e | C 10 | C,10 | 0.110 | 6.41 | 1.65 | 312 |
| f | C 20 | C,20 | 1.875 | 4.20 | 3.03 | 476 |
| g | A 28 | A,28 | 2.650 | 4.25 | 1.9 | 470 |

EXAMPLES 1 TO 10

The starting materials listed in Table 1 are reacted with phenyl isocyanate without addition of catalyst at a temperature of 50° C. The reaction time is 2 hours in Examples 1 to 6 and 10 and 4 hours in Examples 7 to 9. The results are reported in Table 2. The viscosity is measured at 25° C. and indicated in Pas.

Table 2

| Example | starting material | g of iso-cyanate per 1000 g of resin | eq. of iso-cyanate per kg of resin | Degree of modification | viscosity | epoxide content eq./kg | Average mol. wt. |
|---|---|---|---|---|---|---|---|
| 1 | A30 | 80 | 0.5 | 25% | 1.48 | 4.54 | 440 |
| 2 | A30 | 119 | 1.0 | 50% | 2.55 | 4.3 | 465 |
| 3 | A30 | 179 | 1.5 | 75% | 5.30 | 4.1 | 488 |
| 4 | A30 | 238 | 2.0 | 100% | 9.50 | 3.88 | 515 |
| 5 | B30 | 179 | 1.5 | 100% | 0.93 | 4.53 | 442 |
| 6 | B50 | 179 | 1.5 | 67% | 7.74 | 3.25 | 615 |
| 7 | C10 | 130 | 1.09 | 67% | 0.29 | 5.74 | 348 |
| 8 | C10 | 195 | 1.64 | 100% | 0.40 | 5.45 | 367 |
| 9 | C20 | 240 | 2.02 | 67% | 15.0 | 3.39 | 590 |
| 10 | A28 | 170 | 1,43 | 75% | 10.8 | 3.79 | 528 |

EXAMPLES 11 to 14 (Table 3)

Product A30 (experiment (a) in Table 1) is reacted with 4 different monoisocyanates without the addition of a catalyst at a temperature of 50° C. In Examples 13 and 14, the isocyanate is added dissolved in acetone and the solvent is removed in vacuo when the reaction is complete. In all Examples, 1.5 equivalents of isocyanate are used per kg of resin. The degree of modification is 75%. The viscosity is measured at 25° C. and indicated in Pas.

Table 3

| Example | Monoisocyanate | g of isocyanate per 1000 g of resin A 30 | Viscosity | Epoxide content eq./kg | Average mol. wt. |
|---|---|---|---|---|---|
| 11 | m-chlorophenylisocyanate | 230 | 5.2 | 4.15 | 482 |
| 12 | cyclohexylisocyanate | 188 | 2.5 | 4.17 | 478 |
| 13 | reaction product of 2,4-toluylenediisocyanate and methyl alcohol: presumed formula:<br><br>$H_3C-\langle O \rangle-NH-\underset{\underset{O}{\parallel}}{C}-O-CH_3$<br>$OCN$ | 309 | 19 | 3.70 | 540 |
| 14 | reaction product of hexamethylene-1,6-diisocyanate and diethylamine: presumed formula:<br><br>$OCN-(CH_2)_6-NH-CON\begin{smallmatrix}C_2H_5\\C_2H_5\end{smallmatrix}$ | 361 | 11 | 3.55 | 563 |

The epoxy resins of the invention modified with isocyanate can be processed at room temperature without addition of solvent owing to their liquid aggregate state and their reactivity, and, together with amine hardeners (aliphatic polyamines, polyaminoamides, cycloaliphatic polyamines, for example adducts of aromatic amines catalysed with phenols), produce mouldings with excellent elongation in the tensile test and high tear growth resistance according to DIN 53 363.

Coatings with the resins of the invention harden without formation of a dull or tacky surface and have good mechanical properties.

Comparison with an epoxy resin modified with isocyanate and manufactured in accordance with German Offenlegungsschrift No. 1,644,812 but without using a solvent A hydroxylated epoxy resin based on bisphenol A, which as highly viscous product at room temperature can still just be reacted at elevated temperature with monoisocyanate without the concurrent use of a solvent, is used as starting material. The resulting epoxy resin which contains urethane groups is semi-solid at room temperature and can no longer be further processed at all at room temperature or slightly elevated temperature. This constitutes a marked drawback compared with the products of the invention, which have viscosities at room temperature of e.g. 5.30 or 9.50 Pas, while having about the same epoxide content (about 4 eq./kg) and accordingly about the same average molecular weight (about 500), and can therefore be very readily further processed without a solvent.

Use Examples

In the practical application tests on which the following Examples are based, the procedure is as follows:

The epoxy resin mixture which contains urethane groups is mixed at room temperature with the stoichiometric amount of amino hardener corresponding to the epoxide content. Air stirred in during mixing is removed in vacuo from the mixture, a portion of which is then poured into aluminium moulds which have been pretreated with mould release agents, to produce boards measuring 135×135×4 mm, 135×135×1 mm, and shoulder bars in accordance with DIN 53 455, in order to determine the tensile strength. Curing is effected for at least one week at room temperature.

The Shore hardness is determined from the 4 mm boards, whilst trapiziform test samples are cut from the 1 mm boards to determine the tear growth resistance in accordance with DIN 53 363.

To test its suitability as coating material, another portion of the resin/hardener mixture is applied in a layer of 50 μm to an iron plate measuring 350×70×0.8 mm which has been degreased by washing with trichloroethylene. After the film has been cured at room temperature, its appearance is assessed visually and then the cupping according to Erichsen (DIN 53 156) and the impact resistance (impact test, impact resistance of the uncoated side of the iron plate) as well as the angle of deflection on bending in accordance with DIN 53 152 are determined at 20° C. In this last test, the metal plate, with its coated surface upwards, is slowly bent over a steel mandrel having a diameter of 15 mm and the angle of deflection at which the film begins to tear is measured. The test permits an assessment of the elasticity and bond strength of the coating on the carrier.

The values obtained are reported in Tables 4 and 5. Table 4 contains the properties of mouldings and films which have been obtained from mixtures of the invention and technical trimethylhexamethylenediamine as hardener. The properties of an epoxy resin modified in conventional manner with a long chain aliphatic diglycidyl ether and based on bisphenol A (VI: epoxide content: 2.35 eq./kg, viscosity at 25° C.: 2–5 Pas) after curing with trimethylhexamethylenediamine are included in this Table as representing the prior art: Comparison Example V/I. Curing is carried out for 1 week at room temperature. Comparison of the data shows that the resin mixture of the invention results in mouldings that have a greater elongation in the tensile test and a substantially greater tear growth resistance, while at the same time having a greater Shore hardness and tensile strength. The films obtained with the mixtures of the invention are distinguished by a high gloss and a complete lack of surface tackiness compared with those of the prior art.

Table 5 contains the properties of mouldings and films in the manufacture of which the hardener component has been varied in addition to the resin component of the invention. The components employed were: an adduct hardener of technical trimethylhexamethylenediamine and cresyl glycide (H 2) with an equivalent weight of 107 in respect of active hydrogen atoms and a viscosity at 25° C. of 6.8 Pas, a polyaminoamide (H 3) with an amine number of 350–400 and a viscosity at 25° C. of 0.3 Pas, and 4,4′-diamino-3,3′-dimethyldicyclohexylmethane (H 4) as typical cycloaliphatic amine. As comparison there were again used mouldings and films obtained from two bisphenol A epoxy resins modified with a long chain aliphatic diglycidyl ether: VI, V2 (epoxide content: 4.15 eq./kg, viscosity at 25° C.=0.25–0.40 Pas) and the corresponding hardeners. In this case too, the products obtained with the resin mixtures of the invention are distinguished by better moulding properties and by a higher gloss of the films obtained therewith.

Table 4

Properties of mouldings and films obtained from resin mixtures of the invention and technical trimethylhexamethylenediamine

| Example | I | II | III | IV | V | VI | VII | VIII | IX | X | XI | V/I. |
|---|---|---|---|---|---|---|---|---|---|---|---|---|
| Resin mixture of Example | 1 | 2 | 3 | 4 | 5 | 6 | 10 | 11 | 12 | 13 | 14 | V1 |
| Parts by weight of hardener per 100 parts by weight of resin | 17.9 | 17.0 | 16.1 | 15.3 | 17.9 | 12.3 | 15 | 16.4 | 16.5 | 14.6 | 14 | 9.3 |
| Shore-A hardness (units) | 78 | 79 | 99 | 99 | 80 | 75 | 99 | 99 | 80 | 99 | 74 | 57 |
| Tensile strength (N/mm$^2$) DIN 53 455 | — | — | 22.6 | 28.4 | 15 | 12 | 32 | 24.4 | 11.3 | 40 | 5 | 0.6 |
| Elongation (%) DIN 53 455 | — | — | 90 | 92 | 80 | 112 | 23 | 72 | 95 | 45 | 53 | 40 |
| Tear growth resistance (N/mm) DIN 53 363 | 8.7 | 5.6 | 82 | 90 | 60 | 60 | 95 | 97 | 28 | 125 | 17 | 2 |
| Appearance of the 50μm coating film | absolutely clear without surface tackiness, high gloss | | | | | | | | | | | tacky surface |
| Cupping according to Erichsen (mm at 20° C.) | 9.0 | 9.0 | 9.0 | 9.0 | 9.0 | 9.0 | | | | | | 9 |
| Impact resistance (height of drop/drop weight) | 100/2 | 100/2 | 100/2 | 100/2 | 100/2 | 100/2 | | | | | | 100/2 |
| Angle of deflection on bending (°) | 180 | 180 | 180 | 180 | 180 | 180 | | | | | | 180 |

Table 5

Properties of mouldings and films obtained from resin mixtures of the invention and different hardeners

| Example | XII | XIII | XIV | XV | XVI | V/II | V/III | V/IV | V/V |
|---|---|---|---|---|---|---|---|---|---|
| Resin mixture of example | 3 | 5 | 6 | 3 | 3 | V1 | V1 | V2 | V2 |
| Parts by weight of hardener 100 parts by weight of resin | 43.4 H2 | 49 H2 | 35 H2 | 40 H3 | 22.6 H4 | 25 H3 | 25 H2 | 45 H3 | 45 H2 |
| Shore-A hardness (units) | 95 | 70 | 50 | 83 | 50 | 58 | 32 | 72 | 62 |
| Tensile strength (N/mm$^2$) DIN 53 455 | 10 | 3 | 3.4 | 8 | 1 | 0.4 | 0.2 | 1.3 | 1.4 |
| Elongation (%) DIN 53 455 | 200 | 125 | 190 | 83 | 127 | 185 | 115 | 21 | 62 |
| Tear growth resistance (N/mm) DIN 53 363 | 46 | 20 | 25 | 7 | 55 | 1.8 | 3.9 | 2.1 | 4.5 |
| Appearance of the | good, high gloss | | | | | tacky surface | | | good, high |

Table 5-continued

Properties of mouldings and films obtained from resin mixtures of the invention and different hardeners

| Example | Use Examples | | | | | | | | |
|---|---|---|---|---|---|---|---|---|---|
|  | XII | XIII | XIV | XV | XVI | V/II | V/III | V/IV | V/V |
| 50 μm coating film |  |  |  |  |  |  |  |  | gloss |
| Cupping according to Erichsen (mm at 20° C.) | >10 | 3 | 6.4 | 9.6 | 7.0 | 8.2 | 7.3 | 7.6 | 7.8 |
| Impact resistance (weight of drop/drop of weight) | 100/2 | 100/2 | 100/2 | 100/2 | 100/2 | 50/2 | 50/2 | 70/2 | 100/2 |
| Angle of deflection on bending (°) | 180 | 180 | 180 | 180 | 180 | 180 | 180 | 180 | 180 |

What is claimed is:

1. A mixture of compounds of the formula I

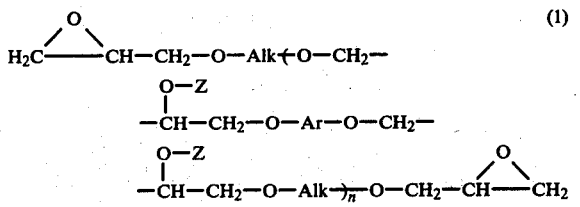

wherein
Alk—represents an alkylene group of 1 to 15 carbon atoms,
Ar—represents an unsubstituted or substituted o-, m- or p-phenylene group or a group of the formula

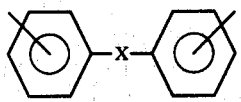

wherein the benzene nuclei can be substituted by halogen, alkyl or alkenyl of 1 to 4 or 2 to 4 carbon atoms respectively, and
X—represents an alkylene or polyoxyalkylene group of 1 to 15 carbon atoms, a carbonyl, oxygen or sulfonyl bridge, and
n in the mixture is in general an integer from 0.3 to 1.5, each Z independently of the other represents hydrogen or the group

wherein R represents an alkyl group of 1 to 10 carbon atoms, a cycloalkyl group containing 5 or 6 carbon atoms in the ring, an aralkyl group of 7 to 10 carbon atoms or a phenyl group which is unsubstituted or substituted by halogen and/or lower alkyl groups, and the above groups can also contain a

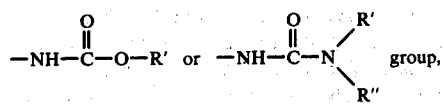

in which R' and R" represent an alkyl group of 1 to 10 carbon atoms, a cycloalkyl group containing 5 or 6 carbon atoms in the ring, an aralkyl group of 7 to 10 carbon atoms or a phenyl group which is unsubstituted or substituted by halogen and/or lower alkyl groups, but 50 to 100% of all the Zs represent the group

and the viscosity η of the mixture is not more than 20 Pas.

2. A mixture of the formula I according to claim 1, wherein Alk represents an alkylene group of 1 to 10 carbon atoms and Ar represents a group of the formula

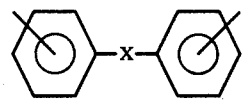

wherein the benzene nuclei can be substituted by alkyl or alkenyl groups of 1 to 4 or 2 to 4 carbon atoms respectively and X represents an alkylene group of 1 to 4 carbon atoms or a carbonyl or oxygen bridge, and n is in general an integer from 0.5 to 1, each Z independently of the other represents hydrogen or the group

wherein R represents a phenyl group which is unsubstituted or substituted by halogen or lower alkyl, but 65 to 100% of all the Zs represent the group

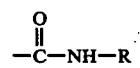

and the viscosity of the mixture at 25° C. is not more than 20 Pas.

3. A mixture of the formula I according to claim 1, wherein Alk represents an alkylene group of 2 to 6 carbon atoms and Ar represents a group of the formula

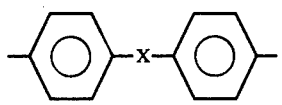

wherein X represents a methylene group, a 2,2-propylene group, a carbonyl or oxygen bridge, and n is in general an integer from 0.5 to 1, each Z independently of the other represents hydrogen or the group $$-\overset{O}{\underset{\|}{C}}-NH-R$$

wherein R represents a phenyl group which is unsubstituted or substituted by halogen and/or alkyl of 1 to 4 carbon atoms, but 65 to 100% of all the Zs represent the group $$-\overset{O}{\underset{\|}{C}}-NH-R$$

and the viscosity of the mixture at 25° C. is not more than 10 Pas.

4. A mixture of the formula I according to claim 1, wherein Alk represents a 1,4-butylene group and Ar represents diphenyl-(4,4')-dimethylmethane, and each Z independently of the other represents hydrogen or the group $$-\overset{O}{\underset{\|}{C}}-NH-\text{C}_6\text{H}_5$$

but 65 to 100% of all the Zs represent the group $$-\overset{O}{\underset{\|}{C}}-NH-\text{C}_6\text{H}_5$$

and the viscosity of the mixture at 25° C. is not more than 10 Pas.

5. A mixture of the formula I according to claim 1, wherein Alk represents a 1,4-butylene group, Ar represents a group of the formula

[structure: diphenyl with C(CH₃)₂ bridge]

and Z represents the group $$-\overset{O}{\underset{\|}{C}}-NH-\text{C}_6\text{H}_5$$

and 25% of the Zs can also represent hydrogen.

6. A mixture of the formula I according to claim 1, wherein Alk represents a 2,2-dimethyl-1,3-propylene group, Ar represents a group of the formula

[structure: diphenyl with C(CH₃)₂ bridge]

and Z represents hydrogen or the group $$-\overset{O}{\underset{\|}{C}}-NH-\text{C}_6\text{H}_5$$

and 25% of the Zs represent hydrogen.

7. A mixture of the formula I according to claim 1, wherein Alk represents a 1,4-butylene group, Ar represents a group of the formula

[structure: diphenyl with C(CH₃)₂ bridge]

and Z represents hydrogen or the group $$-\overset{O}{\underset{\|}{C}}-NH-\text{Ar with NH-C(=O)-O-CH}_3 \text{ and CH}_3$$

and 25% of the Zs represent hydrogen.

8. A process for the production of a mixture of the formula I according to claim 1, which comprises reacting a compound of the formula II $$H_2C\overset{O}{\underset{\diagdown}{-}}CH-CH_2-O-Alk-(O-CH_2-CH(OH)-CH_2-O-Ar-O-CH_2-CH(OH)-CH_2-O-Alk)_{\overline{n}}O-CH_2-CH\overset{O}{\underset{\diagdown}{-}}CH_2, \quad (II)$$

wherein Alk and Ar as defined in claim 1, with a compound of the formula III $$R-N=C=O \quad (III)$$

wherein R is as defined in claim 1, in such amounts that 1 to 2 molecules of the compound of the formula III are present per 2 hydroxyl groups.

9. A process according to claim 8, wherein a compound of the formula II is reacted with a compound of the formula III, and Alk, Ar and R have the same meanings as in claim 2, such that 65 to 100% of all hydroxyl groups are reacted with the compound of the formula III.

10. A process according to claim 8, wherein a compound of the formula II is reacted with a compound of the formula III, and Alk, Ar and R have the same meanings as in claim 3, such that 65 to 100% of all hydroxyl groups are reacted with the compound of the formula III.

11. A process according to claim 8, wherein a compound of the formula II is reacted with a compound of the formula III, and Alk, Ar and R have the same meanings as in claim 4, such that 65 to 100% of all hydroxyl groups are reacted with the compound of the formula III.

12. A process according to claim 8, wherein the reaction is carried out in the presence of a solvent and/or a catalyst at a temperature of 50° to 60° C.

13. A curable mixture which contains a mixture of the formula I according to any one of claims 1 to 7 and a hardener for epoxy resins.

14. A curable mixture according to claim 13 which contains, as epoxy resin hardener, an amine hardener, an epoxy/amine adduct or a polyaminoamide.

15. A curable mixture according to claim 14 which contains, as amine hardener, an epoxy/amine adduct or a polyaminoamide.

16. A curable mixture according to claim 14 which contains, as hardener, trimethylhexamethylenediamine or an adduct thereof with cresyl glycide.

17. A process for the manufacture of flexible mouldings with high tear growth resistance, wherein a mixture according to any one of claims 13 to 16 is cured at room temperature.

* * * * *